US008419331B2

(12) United States Patent
Goettlich

(10) Patent No.: US 8,419,331 B2
(45) Date of Patent: Apr. 16, 2013

(54) SYSTEM COMPRISING A COMPOSITE ANCHOR BOLT AND GLUE

(75) Inventor: Jutta Goettlich, Bissendorf (DE)

(73) Assignee: Eugen Schnarr, Grossostheim (DE)

( * ) Notice: Subject to any disclaimer, the term of this patent is extended or adjusted under 35 U.S.C. 154(b) by 266 days.

(21) Appl. No.: 12/736,006

(22) PCT Filed: Feb. 20, 2009

(86) PCT No.: PCT/EP2009/001235
§ 371 (c)(1),
(2), (4) Date: Aug. 31, 2010

(87) PCT Pub. No.: WO2009/109300
PCT Pub. Date: Sep. 11, 2009

(65) Prior Publication Data
US 2010/0329812 A1    Dec. 30, 2010

(30) Foreign Application Priority Data

Mar. 7, 2008  (EP) .................................... 08004246
Mar. 19, 2008  (EP) .................................... 08005097

(51) Int. Cl.
*F16B 35/04* (2006.01)
(52) U.S. Cl.
USPC ........................................... 411/82; 411/412
(58) Field of Classification Search ........... 411/82–82.3, 411/412, 386, 930
See application file for complete search history.

(56) References Cited

U.S. PATENT DOCUMENTS

| 3,897,713 | A  |   | 8/1975  | Gugle |
| 4,439,077 | A  | * | 3/1984  | Godsted ........................ 411/411 |
| 5,061,136 | A  | * | 10/1991 | Dixon et al. .................. 411/412 |
| 5,531,553 | A  | * | 7/1996  | Bickford ....................... 411/389 |
| 5,885,041 | A  | * | 3/1999  | Giannuzzi et al. ............. 411/82 |
| 6,296,433 | B1 | * | 10/2001 | Forsell et al. ................. 411/386 |
| 6,322,307 | B1 | * | 11/2001 | Glover .......................... 411/412 |
| 6,918,727 | B2 | * | 7/2005  | Huang .......................... 411/389 |
| 7,070,376 | B1 | * | 7/2006  | Toback ....................... 411/82.2 |
| 7,309,199 | B2 | * | 12/2007 | Ayrle ............................ 411/82 |

FOREIGN PATENT DOCUMENTS

EP   1 591 596   11/2005

OTHER PUBLICATIONS

International Search Report, Nov. 11, 2010.

* cited by examiner

*Primary Examiner* — Flemming Saether
(74) *Attorney, Agent, or Firm* — Collard & Roe, P.C.

(57) ABSTRACT

The invention relates to a system comprising a composite anchor bolt (10) and glue (12), wherein the bolt (10) can be screwed directly into a bore (14) that is at least partially provided with the glue (12) and is introduced in a fixed anchoring base (16), wherein the bolt (10) has a bolt head (18) having a tool application element, a substantially cylindrical shaft (20), and two or more, however, preferably three thread turns (22, 24, 26), which are disposed parallel to each other and extend helically at least partially across the length of the shaft (20), wherein the respective distance (p1, p2, p3) between the thread turns (22, 24, 26) is selected such that the glue (12) present in the bore (14) is evenly distributed between the wall (32) of the bore (14) and the bolt (10) upon screwing the bolt (10) into the bore (14).

9 Claims, 1 Drawing Sheet

SYSTEM COMPRISING A COMPOSITE ANCHOR BOLT AND GLUE

CROSS REFERENCE TO RELATED APPLICATIONS

This application is the National Stage of PCT/EP2009/001235 filed on Feb. 20, 2009, which claims priority under 35 U.S.C. §119 of European Application No. 08 004 246.8 filed on Mar. 7, 2008 and European Application No. 08 005 097.4 filed on Mar. 19, 2008, the disclosures of which are incorporated by reference. The international application under PCT article 21(2) was not published in English.

BACKGROUND OF THE INVENTION

1. Field of the Invention

The invention relates to a system comprising a composite anchor bolt and glue.

2. The Prior Art

In order to brace anchors, such as threaded rods, armoring or other anchoring systems, in an anchoring base, it is known to initially drill a hole into the anchoring base by means of a drilling machine. The drilled hole is then cleaned and provided with glue. The glue is usually injected by means of a cartridge pistol from the borehole base, while slowly pulling out the cartridge tip at the same time. It is here absolutely necessary that air pockets be avoided. In the case of deep boreholes, an extension hose is normally used to introduce the glue. The anchor, for example the threaded rod, armoring or other anchoring system, is then introduced into the borehole with a rotating motion. The method is complicated and entails danger, since too rapid an introduction can result in air pockets on the metal of the anchor, which may impair the subsequent function and safety of the system, just like a shrink hole in metal casting.

The disadvantage to this system is that the used glues are normally not fireproof, so that the anchors, and hence the objects secured to the anchor, fall out of the anchoring base given a fire, and often even when exposed to a slight level of heat, and can cause immense damages.

Further, it is absolutely essential that the anchors not be moved or stressed after they have been set for the time it takes for the glue to cure, which can take several hours to days. This leads to delays in the jobs to be performed later.

Another disadvantage is that overhead applications often require a temporary fixation of the anchor, so as to prevent the latter from already falling out of the anchoring base under its own weight during the cure period.

Vibrations or dynamic loads in the anchoring base can also cause the cured glue complete with anchor to disadvantageously fall out of the anchoring base under the dynamic load. Glue creep or relaxation of the entire anchoring system can also trigger a failure in terms of structural and load-bearing capacity.

In addition, very long anchoring depths are selected to ensure that the anchor is sufficiently secured by means of the glue. This limits the application of such systems comprised of anchors and glue.

SUMMARY OF THE INVENTION

Proceeding from this prior art, the object of the invention is to avoid the mentioned disadvantages and provide a further developed system of the kind mentioned at the outset, in which the anchor can be placed under a load immediately after set.

This object is achieved by a system comprised of a composite anchor bolt and glue, in which the bolt can be screwed directly into a borehole that is at least partially provided with the glue and introduced into a fixed anchoring base, wherein the bolt has a bolt head with a tool application element, a substantially cylindrical shaft, and two or more, but preferably three thread turns, which are arranged parallel to each other and extend helically at least partially across the length of the shaft, wherein the respective distance between the thread turns is selected in such a way that the glue present in the borehole is evenly distributed between the wall of the borehole and the bolt when screwing the bolt into the borehole.

In an amazingly simple way, this provides a system in which the anchor in the form of a composite anchor bolt is braced in the anchoring base in a firmly bonded manner by the glue, and also non-positively and positively by the bolt-like design of the anchor. This combination of chemical and mechanical fixation yields a higher level of fire resistance, enables a shorter installation length, and in particular ensures that a load can immediately be placed on the anchor without having to wait until the glue has cured completely. Glue creep is tangibly diminished, since the bulk of the anchor load is transferred from the thread turns to the anchoring base.

As a result of the special configuration of the composite anchor bolt, the glue is distributed largely without shrink holes, meaning without air pockets, in the gap between the wall of the borehole and the bolt. The hydropneumatic pressure that arises inside the borehole while screwing in the composite anchor screw is responsible for the above, in particular causing the glue to become pressed against the setting direction toward the borehole opening as the process of screwing in continues, wherein the glue becomes evenly distributed, in particular also due to the configuration of the composite anchor bolt, thereby ensuring a very good surface attachment between the wall and glue on the one hand, and between the bolt and glue on the other.

The term "fixed anchoring base" has a broad interpretation. In addition to concrete, natural or artificial stone, solid rock, brickwork or similar materials, a fixed anchoring base is also taken to mean friable brickwork material, soft brick, or another soft stone. Wood can also be used to make a fixed anchoring base. Aerated concrete is preferred as the fixed anchoring base.

In one further development of the invention, the thread turns vary in outside diameter. It is further provided that the outside diameter of a first thread turn be larger than the outside diameter of the second thread turn following the first thread turn in the setting direction, and that the outside diameter of the second thread turn be larger than the outside diameter of the third thread turn following the second thread turn in the setting direction.

It has been proven advantageous for the second and third thread turn, which each have a smaller outside diameter than the first thread turn, be the thread turns that first cut into the wall of the borehole, and correspondingly absorb the primary load while screwing the bolt into the borehole. By contrast, the first thread turn, meaning the one with the greatest outside diameter, is exposed to the least load, and cuts into the wall of the borehole under a correspondingly low stress. Consequently, the thread turn with the greatest diameter is protected against damage. Only after the bolt has been screwed in does the first thread turn, meaning the thread turn with the largest outside diameter, exert its effect, transferring retention forces into the wall of the borehole, meaning into the fixed anchoring base. The fact that the thread turn with the largest outside diameter cuts deepest into the wall of the borehole improves the transfer of forces from the bolt to the anchoring base.

At the same time, the other thread turns impart retention forces to the wall of the borehole, so that the forces are better distributed as a whole when conveyed into the wall of the borehole.

This relieves the burden on the glue, and tangibly reduces the disadvantageous creep.

The outside diameter of a thread turn is measured via the thread ridge. Each thread turn has a constant outside diameter over the length of the shaft. Each thread turn is preferably designed as an angular thread with a flattened tip.

In one advantageous embodiment of the invention, the pitch of the threaded band is selected in such a way as to create a threadless region between the shaft and wall large enough to ensure optimal adhesion between the glue and bolt, as well as between the glue and wall.

In particular when taken in conjunction with the differing outside diameters of the thread turns, the varying distances between the preferably three thread turns improve not just the transfer of forces from the bolt to the anchoring base, but also ensure that the glue is initially pressed into the borehole in the direction of the borehole base while screwing in the bolt, during which air escapes, and subsequently wanders against the setting direction along the thread turns [against the setting direction], becoming evenly distributed between the wall of the borehole and the bolt in the process.

The so-called bore dust that arises as the thread turns cut into the wall of the borehole are here preferably also conveyed out of the borehole against the setting direction. This prevents bore dust from pressing against the wall of the borehole and resulting in undesired stresses inside the wall. In addition, better contact is established between the glue and wall, as well as between the glue and bolt.

The distance between the first thread turn and second thread turn is preferably larger than the distance between the second thread turn and the third thread turn.

As a whole, it was discovered that at least three thread turns in conjunction with the varying distances between the thread turns also yields less stresses in the anchoring base. In particular in the case of soft or friable anchoring base, preferably aerated concrete, the distance between adjacent boreholes in the anchoring base can be diminished in this way. In other words, the number of boreholes on a given unit area can be advantageously increased.

The threaded rods best form a kind of threaded band, which extends helically at least partially over the length of the shaft, wherein the pitch of the threaded band measures at least one band width.

This has proven to be beneficial in giving the bond a strong retention strength in the fixed anchoring base.

In one advantageous embodiment of the invention, each thread run has a flank angle that differs from the other thread run, wherein the flank angle preferably correlates with the outside diameter of the thread run in such a way that a larger flank angle is provided at a smaller outside diameter, and vice versa.

A flank angle of 8 to 30° has proven especially favorable for the first thread run, while these figures are 16 to 40° the second thread run, and 24 to 45° for the third thread run.

In a preferred exemplary embodiment, the first thread run has a flank angle of 28°, the second thread run has a flank angle of 33°, and the third thread run has a flank angle of 40°.

A further development of the invention provides that the outside diameter of the thread runs be dimensioned in such a way that the thread runs dig and furrow into the wall of the borehole while being screwed in.

This means that the diameter of the borehole is smaller than the outside diameter of the smallest thread run, so that the thread run with the smallest outside diameter also cuts into the wall of the borehole, and helps to retain the bolt in the fixed anchoring base.

The glue is preferably a chemically hardening glue, especially preferably an epoxy resin glue, a methyl methacrylate glue or a polyester glue.

In one advantageous embodiment of the invention, the distance between the wall of the borehole and the core diameter of the screwed-in shaft measures 0.1 to 1 mm, preferably 0.3 to 1 mm.

BRIEF DESCRIPTION OF THE DRAWINGS

In the following, the invention will be explained based on an exemplary embodiment, which is shown in the drawing. The drawing shows.

DETAILED DESCRIPTION OF THE PREFERRED EMBODIMENTS

The same reference numbers in both figures denote identical components.

Figure 1:
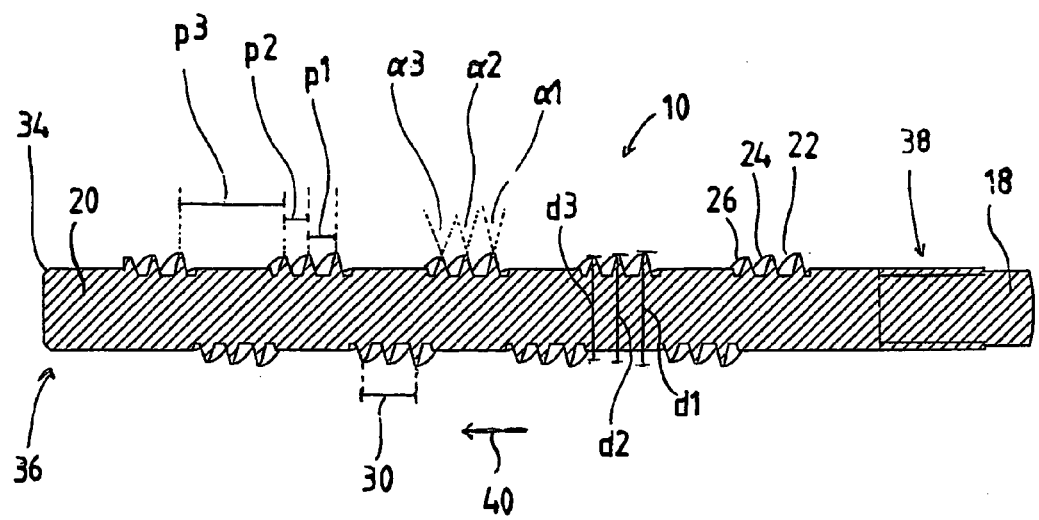
FIG. 1 A cross sectional view of a composite anchor bolt of the system according to the invention, and FIG. 2 A side view of a system according to the invention comprised of a composite anchor bolt and glue introduced into a borehole.

The composite anchor bolt 10 shown on FIG. 1 has a truncated, slightly tapered tip 34 at a front bolt end 36, and a bolt head 18 at a rear bolt end 38. The truncated, tapered tip 34 facilitates the introduction of the composite anchor bolt 10 into the borehole 14 depicted on FIG. 2. In the exemplary embodiment shown, the bolt head 18 is formed in an exemplary tool application element; this top shape is advantageous, but not mandatory.

The composite anchor bolt 10 has three thread turns 22, 24, 26, which are arranged parallel to each other and helically extend over the length of the shaft 20.

The thread runs 22, 24, 26 have varying outside diameters d1, d2, d3. The outside diameter d1 of a first thread run is larger than the outside diameter d2 of the second thread run 24 following the first thread run 22 in the setting direction 40.

The outside diameter d2 of the second thread run 22 is larger than the outside diameter d3 of the third thread run following the second thread run 24 in the setting direction 40.

The distance p1, p2 and p3 of the treaded runs 22, 24, 26 relative to each other differs.

Figure 2:
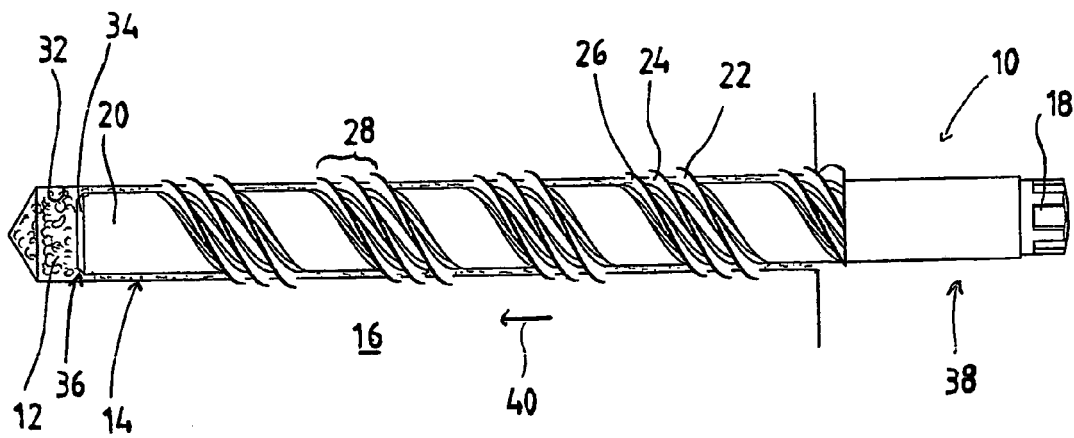

The outside diameters d1, d2, d3 are each larger than the inside diameter of the borehole 14, so that all thread runs 22, 24, 26 cut into the wall 32 of the borehole 14 while screwing the composite anchor bolt 10 into the borehole 14 shown on FIG. 2.

The thread runs 22, 24, 26 form a kind of threaded band 28, which helically extends over the length of the shaft 20, wherein the pitch of the threaded band 28 measures at least one band width 30.

The pitch of the composite anchor bolt 10 is the distance from one winding of a thread run 22, 24 or 26 to the following winding of the same thread run 22, 24 or 26, meaning the sum of distances p1, p2 and p3, of the thread runs 22, 24 and 26 from each other.

Correspondingly, the band width 28 is the sum of distances p1 and p2 of the thread runs 22 and 24 as well as 24 and 26.

Each thread run 22, 24 and 26 has a flank angle α1, α2 and α3 differing from another thread run 22, 24 and 26, which becomes smaller as the outside diameter increases.

The rear bolt end 38, which preferably has a single-start thread (not shown here), remains outside the borehole 14, and is used to secure the object, for example by screwing on a nut (not shown here).

On FIG. 2, the composite anchor bolt 10 is screwed into a borehole 14 of a fixed anchoring base 16, which is provided with a prescribed quantity of glue 12. The glue 12 has here become evenly distributed between the bolt 10 and wall 32 of the borehole 14.

Of course, the invention is not limited to the exemplary embodiment, but can be modified in numerous ways within the framework of the disclosure.

REFERENCE LIST

Part of the Specification

10 Bolt
12 Glue
14 Borehole
16 Anchoring base
20 Shaft
22 $1^{St}$ thread run
24 $2^{nd}$ thread run
26 $3^{rd}$ thread run
28 Threaded band
30 Band width
32 Wall
34 Tip
36 Front bolt end
38 Rear bolt end
40 Setting direction
d1 $1^{st}$ outside diameter
d2 $2^{nd}$ outside diameter
d3 $3^{rd}$ outside diameter
p1 $1^{st}$ distance
p2 $2^{nd}$ distance
P3 $3^{rd}$ distance
α1 $1^{st}$ flank angle
α2 $2^{nd}$ flank angle
α3 $3^{rd}$ flank angle

The invention claimed is:

1. A system comprising:
   a composite anchor bolt having:
   a bolt head with a tool application element;
   a substantially cylindrical shaft; and
   two or more thread turns arranged parallel to each other and extending helically at least partially along a length of the substantially cylindrical shaft; glue; and
   a fixed anchoring base having a borehole, the borehole having a wall and being at least partially provided with the glue; and
   wherein the composite anchor bolt is screwed directly into the borehole such that the composite anchor bolt is introduced into the fixed anchoring base;
   wherein via a respective distance between the two or more thread turns the glue present in the borehole is evenly distributed between the wall of the borehole and the composite anchor bolt after the composite anchor bolt is screwed into the borehole,
   wherein the two or more thread turns comprises a first thread turn, a second thread turn, and a third thread turn, and
   wherein a distance between the first thread turn and the second thread turn is different from a distance between the second thread turn and the third thread turn.

2. The system according to claim 1, wherein the first thread turn has a diameter different from a diameter of the second thread turn.

3. The system according to claim 1, wherein an outside diameter of the first thread turn is larger than an outside diameter of the second thread turn, the second thread turn following the first thread turn in a setting direction, and
   wherein the outside diameter of the second thread turn is larger than an outside diameter of the third thread turn, the third thread turn following the second thread turn in the setting direction.

4. The system according to claim 1, wherein the two or more thread turns form a threaded band and the threaded band helically extends at least partially across the length of the substantially cylindrical shaft.

5. The system according to claim 4, wherein via a pitch of the threaded band a threadless region between the substantially cylindrical shaft and wall of the borehole is present and is large enough to ensure optimal adhesion between the glue and the composite anchor bolt, as well as between the glue and the wall of the borehole.

6. The system according to claim 1, wherein the first thread turn has a flank angle different from a flank angle of the second thread turn.

7. The system according to claim 1, wherein outside diameters of the two or more thread turns are dimensioned in such a way that the two or more thread turns dig and furrow into the wall of the borehole while the composite anchor bolt is screwed into the borehole.

8. The system according to claim 1, wherein the glue is a chemically hardening glue.

9. The system according to claim 1, wherein a distance between the wall of the borehole and an outside of the substantially cylindrical shaft of the composite anchor bolt screwed into the borehole measures 0.1 to 1 mm.

* * * * *